Aug. 6, 1940.　　　　P. C. RADER　　　　2,210,177
PROTECTION OF TEMPORARY PROTECTIVE COATINGS
Filed Dec. 28, 1938
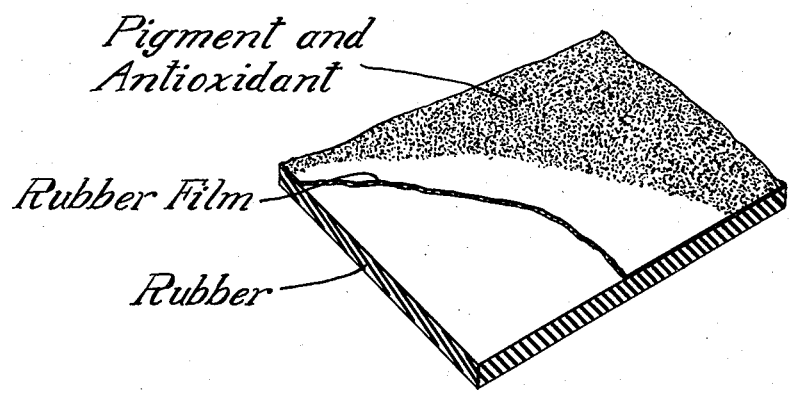
Inventor
Persons C. Rader
By Willis F. Avery
Atty Patented Aug. 6, 1940

2,210,177

UNITED STATES PATENT OFFICE 2,210,177

PROTECTION OF TEMPORARY PROTECTIVE COATINGS

Persons C. Rader, Cuyahoga Falls, Ohio, assignor to The B. F. Goodrich Company, New York, N. Y., a corporation of New York Application December 28, 1938, Serial No. 248,036

2 Claims. (Cl. 152—330)

This invention relates to temporary protective coatings made of rubber.

It is old in the art to apply a thin film of readily-removable rubber to surfaces to provide a temporary protection from dirt, grit, or physical contacts which might mar the surface. The temporary protective coating is ordinarily applied during or immediately after the manufacture of the article, and is usually allowed to remain on the article until the article is to be used. Thus, rubber tires, particularly those having white or light-colored sidewalls, are sprayed with or dipped in a natural or artificial dispersion of rubber. The film which is formed protects the tire from mars and scratches and the sidewall from stains and dirt, and is ordinarily left on the tires until they have been placed on cars and the car is ready for delivery.

These thin rubber films, which are ordinarily about .01–.02 inch thick are even more subject to deterioration than thicker rubber masses. Exposure to the light and air soon makes the film become sticky, and it is difficult or impossible to remove the temporary protective coating from the tire when desired. Antioxidants cannot be incorporated in the temporary protective coating because under the influence of light, they stain not only the coating but also the light-colored surface underneath. Applying the antioxidant to the surface of the coating reduces the staining to some extent, but in bright sunlight even this treatment stains both the temporary protective coating and the light-colored sidewall. This staining is particularly true of powerful antioxidants such as diphenyl amine, phenyl beta-naphthylamine, ketone-amines, but even antioxidants having less tendency to stain such as the monobenzyl ether of hydroquinone, para-hydroxy N-phenylglycine, di-beta-naphthyl para-phenylene diamine, and para-hydroxy N-phenylmorpholine will stain to such an extent that their use is undesirable.

I have discovered that temporary protective coatings may be protected from deterioration without staining by applying to the surface of the coating an aqueous dispersion containing an antioxidant and an inert opaque pigment. Although the action is not entirely understood, it is believed that the pigment shields the surface of the protective coating from the light to such an extent that sufficient staining to affect the surface underneath does not occur. The inert pigment fulfills the further function of removing any surface tack on the coating and permitting tires with treated coatings to be placed in contact with each other or with other surfaces without damage to the coating.

The pigment may be any opaque material which shields the tire from light such as mica, graphite, diatomaceous earth, soapstone, talc, clay, starch, etc. The pigment is preferably present in the dispersion in a concentration of from 10–25%.

The antioxidant may be selected without reference to its tendency to stain. Even powerful antioxidants with bad staining characteristics such as phenyl beta-naphthylamine may be used without fear of discoloring of the surface underneath the temporary protective coating. The percentage of antioxidant in the dispersion ordinarily ranges from 0.5% to 5%.

The invention may be better understood from the accompanying drawing showing in successive layers a stainable rubber surface, a rubber film, and a mixture of pigment and antioxidant.

As a specific example, 100 parts by weight of an antioxidant such as sym di-beta-naphthyl para-phenylene diamine was dispersed in 200 parts of water. This antioxidant dispersion was then included in the following recipe:

| | | |
|---|---|---|
| Bentonite clay | lbs | 19.45 |
| Pigment | do | 200.00 |
| Wetting agent | do | 0.75 |
| Antioxidant dispersion | do | 39.00 |
| Water | gals | 86.00 |

The pigment in the above example was soapstone, though other inert, opaque pigments may be used or the amount of clay may be increased and used as the only pigment in the dispersion. The wetting agent may be sodium lauryl sulfate, sodium naphthalene sulfonate, soap, or other synthetic or natural saponaceous material.

Rubber tires having white sidewalls covered with temporary protective coatings were sprayed with the above dispersion and allowed to dry. It was found by a comparison of tires having treated and untreated temporary protective coatings which were exposed to the sunlight, that the life of the coatings treated by the method of this invention was doubled. Even though the treated temporary protective coating eventually became sticky, there was no staining of the white sidewall.

It is obvious that the method of this invention can be applied to any stainable rubber surface covered with a rubber temporary protective coating. This invention is accordingly not limited to the embodiments herein disclosed, for the invention is subject to many modifications which will be apparent to those skilled in the art.

I claim:

1. An article of manufacture comprising a stainable rubber surface, a thin temporary protective rubber coating, and a layer of an opaque, inert pigment uniformly intermixed with an antioxidant, on said coating.

2. A tire having a white sidewall, said tire being covered with a thin temporary protective rubber coating having a layer of soapstone uniformly intermixed with an antioxidant, on the surface thereof.

PERSONS C. RADER.